United States Patent [19]
Bayens et al.

[11] 3,766,661
[45] Oct. 23, 1973

[54] APPARATUS AND METHOD FOR CONCENTRATING A TWO-PHASE GAS-SOLID MIXTURE FOR INJECTION INTO A REACTOR

[75] Inventors: Charles A. Bayens, Houston, Tex.; Ivan S. Bjorklund, San Francisco, Calif.

[73] Assignee: Shell Oil Company, New York, N.Y.

[22] Filed: Apr. 2, 1971

[21] Appl. No.: 130,699

[52] U.S. Cl............................ 34/10, 23/262, 23/284, 34/33, 34/57 E, 34/168, 165/104
[51] Int. Cl. ......... F26b 3/08, F26b 3/10, B01j 9/14
[58] Field of Search................... 23/284, 284.3, 262, 23/1 R; 165/104; 34/10, 33, 57 E, 168

[56] References Cited
UNITED STATES PATENTS

| | | | |
|---|---|---|---|
| 2,799,095 | 7/1957 | May et al................................ | 34/10 |
| 2,885,272 | 5/1959 | Kimberlin et al....................... | 23/284 |
| 3,265,775 | 8/1966 | Friedrich ............................ | 34/10 X |
| 3,364,583 | 1/1968 | Friedrich ............................... | 34/10 |
| 3,364,589 | 1/1968 | Muller................................. | 34/57 E |
| 3,526,483 | 9/1970 | Deussner et al. ...................... | 23/284 |
| 3,529,356 | 9/1970 | Diettrich............................. | 34/10 X |

FOREIGN PATENTS OR APPLICATIONS

| | | | |
|---|---|---|---|
| 608,383 | 11/1960 | Canada.............................. | 23/284.3 |
| 840,349 | 7/1960 | Great Britain ........................ | 23/284 |
| 137,467 | 10/1952 | Sweden................................ | 23/1 R |

*Primary Examiner*—Barry S. Richman
*Attorney*—F. Marlowe and Harold L. Denkler

[57] ABSTRACT

Apparatus and method for concentrating a two-phase gas-solids mixture within a cyclone separator and utilizing the energy of the cyclone's concentrated solids stream for the purpose of injecting and dispersing said solid particles into a reactor. The mixture is introduced into the separator with a tangential vortexing motion permitting the mixture to flow downwardly in a spiral. The gas phase of the mixture is separated and removed from the separator through the gas exit at the top, while the solids phase of the mixture is removed through the solids exit at the bottom in the form of a hollow, swirling cone of solids which is then passed directly into a reactor while a gas adapted to react with the solids is injected therein into communication with the cone of solids.

2 Claims, 4 Drawing Figures

Patented Oct. 23, 1973 3,766,661
2 Sheets-Sheet 1
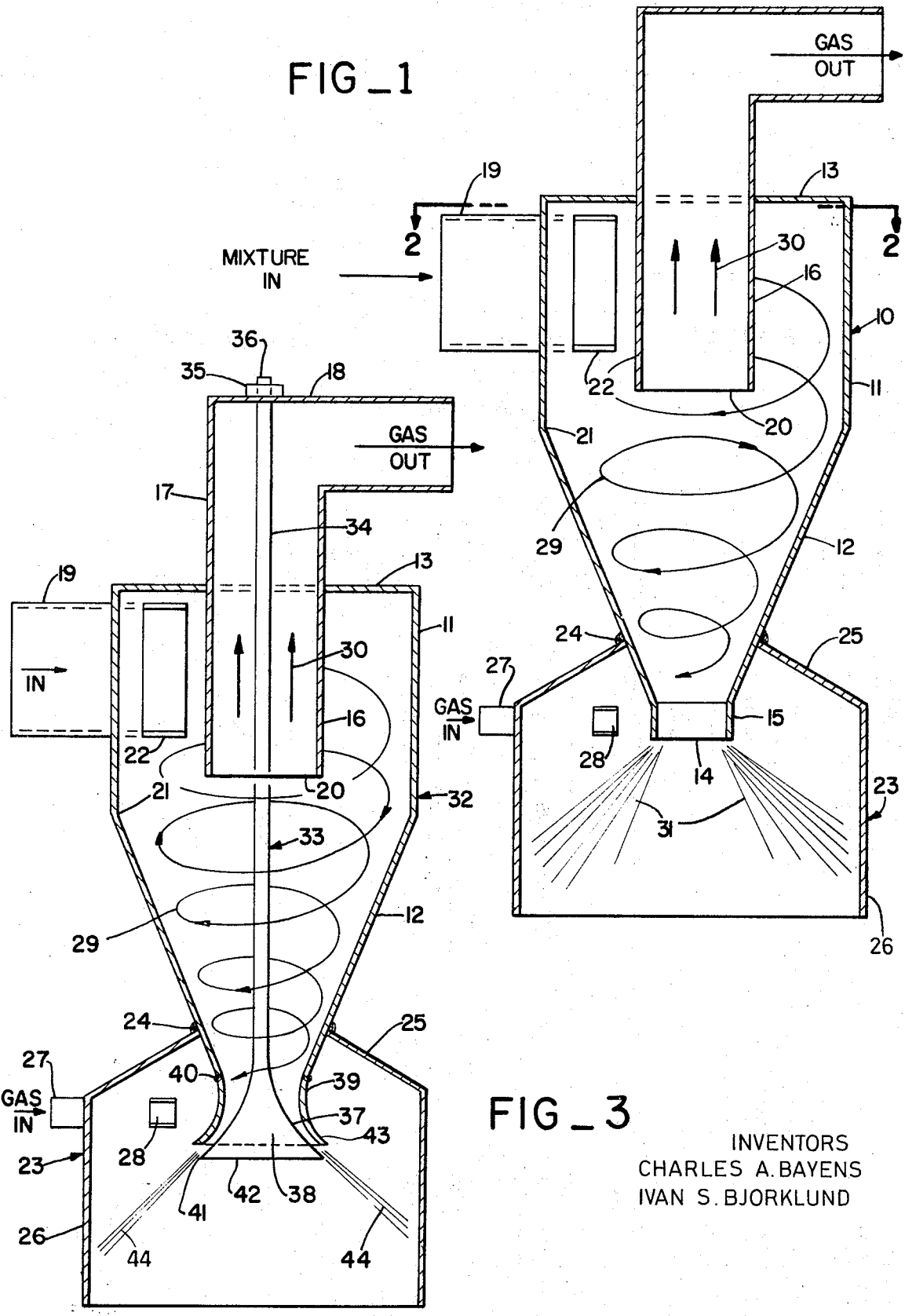
FIG_1
FIG_3
INVENTORS
CHARLES A. BAYENS
IVAN S. BJORKLUND

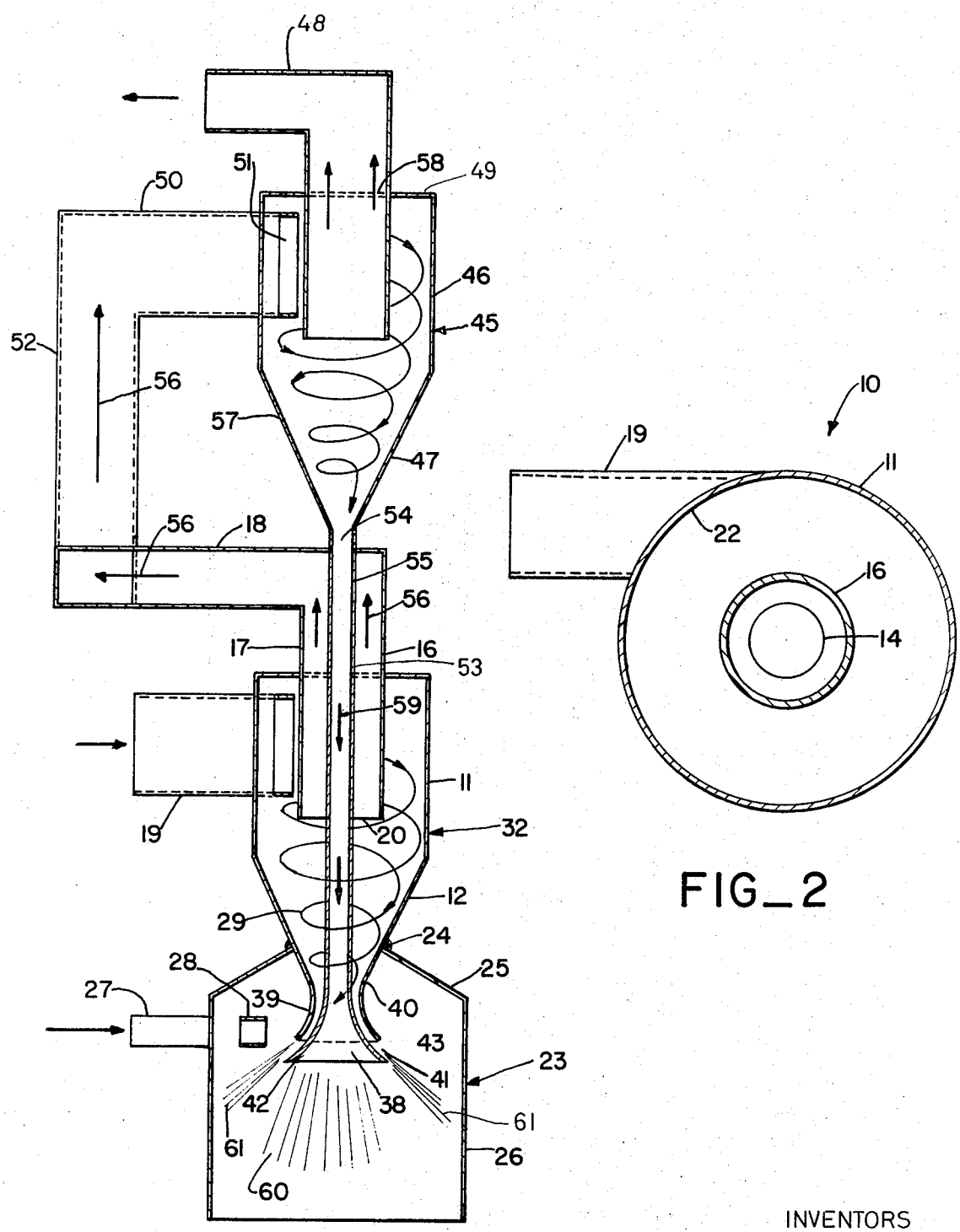
FIG_4
FIG_2
INVENTORS
CHARLES A. BAYENS
IVAN S. BJORKLUND

APPARATUS AND METHOD FOR CONCENTRATING A TWO-PHASE GAS-SOLID MIXTURE FOR INJECTION INTO A REACTOR

BACKGROUND OF THE INVENTION

The invention relates to the concentration of two-phase mixtures; and, more particularly, to apparatus and method for concentrating a two-phase gas-solids mixture and subsequently injecting the solid phase into a reactor.

DESCRIPTION OF THE PRIOR ART

In certain processes, a two-phase gas-solids mixture such as a mixture of coke particles and steam, must be concentrated, i.e., a large fraction of the steam must be removed. Subsequently, the concentrated coke-in-steam mixture is injected into a reactor where a fast reaction between the coke and a second gas occurs.

In prior art processes, the concentration and injection are accomplished separately. A cyclone is conventionally used to concentrate such mixtures, but the angular and axial momentum of the concentrated solids stream from a cyclone is wasted. There is thus a need for an apparatus and method for injecting a concentrated two-phase gas-solids mixture into a reactor without the necessity of external injection means.

SUMMARY OF THE INVENTION

It is an object of this invention to provide an apparatus and a method for concentrating a two-phase gas-solids mixture in a manner whereby the resulting solids phase can be dispersed across a reactor.

It is a further object of this invention to provide apparatus and method for utilizing the large angular and axial momentum possessed by the solids phase to inject the solids phase into a reactor without dissipation of the solids phase momentum.

These and other objects are preferably accomplished by concentrating a two-phase gas-solids mixture within a cyclone separator having a solids exit at the bottom and a gas exit at the top. The mixture is introduced into the separator with a tangential vortexing motion permitting the mixture to flow downwardly in a spiral. The gas phase of the mixture is largely separated and removed from the separator through the gas exit while the solids phase of the mixture is removed through the solids exit in the form of a hollow, swirling cone of solids which is then passed directly into a reactor while a gas adapted to react with the solids is injected therein into communication with the cone of solids.

BRIEF DESCRIPTION OF THE DRAWINGS

FIG. 1 is a vertical sectional view of the preferred apparatus for carrying out the techniques of our invention;

FIG. 2 is a view taken along lines II—II of FIG. 1;

FIG. 3 is a view similar to FIG. 1 showing a modification of the apparatus of FIG. 1; and FIG. 4 is a vertical sectional view of a further modification of the apparatus of FIG. 1.

DESCRIPTION OF THE PREFERRED EMBODIMENTS

In certain processes, it is necessary that a two-phase gas-solids mixture, such as a mixture of coke particles and steam, be concentrated, i.e., a large fraction of the gas (steam) must be removed. Subsequently, the concentrated solids-in-gas mixture is injected into a reactor where a fast reaction between the solids and a second gas occurs.

In the past, these steps of concentration and injection were accomplished separately. A cyclone separator is conventionally used to concentrate such mixtures, but the angular and axial momentum of the concentrated solids stream from such a cyclone separator is wasted.

Referring now to the drawings, apparatus is shown wherein a two-phase mixture of solid particles and gas may be concentrated, then the concentrated solid particles are injected, with little or no additional pressure losses, into a reactor. The resulting hollow, swirling cone of solid particles within the reactor provides good mixing and uniform distribution.

Thus, in FIG. 1, a cyclone-injector 10 is shown having a first upper generally cylindrical body portion 11 and a second lower generally inwardly and downwardly tapered conically-shaped body portion 12 integral therewith. Body portion 11 is closed at its upper end by a top wall 13 while body portion 12 forms a restricted opening 14 at its lower end in the preferred form of a third generally cylindrical body portion 15, integral with second body portion 12 and of an inside diameter appreciably less than the inside diameter of the first body portion 11.

A gas outlet tube 16 extends through the top wall 13 of body portion 11 into communication with the interior of cyclone-injector 10.

A gas-solids mixture inlet 19 extends through the generally cylindrical first body portion 11 below the wall 13 but preferably above the gas outlet 20 of tube 16. The outlet 20 of tube 16 is also preferably slightly above the beginning of the tapered body portion 12 (i.e., at the junction 21 of body portions 11 and 12). The mixture inlet 19 opens tangentially, as at tangential opening 22, into the interior of cyclone-separator 10 (see FIG. 2).

It is to be understood that gas outlet tube 16 communicates with suitable means (not shown) for recovering gases from cyclone-separator 10. Also, mixture inlet 19 may form a portion of suitable processing equipment (not shown) for automatically and selectively injecting a gas-solids mixture through inlet 19 and into the interior of cyclone-injector 10 at any desired velocity.

A reactor 23 is disposed at the lower end of the cyclone-injector 10. Reactor 23 is preferably secured to cyclone-injector 10 in a fluid-tight manner, as, for example, by welding 24 to lower body portion 12. It is only necessary that the restricted opening 14 opens into the interior of the reactor 23 as shown in FIG. 1. Reactor 23 may thus take any suitable configuration, as, for example, a first generally outwardly tapered conically shaped body portion 25 extending from welding 24, then a second generally cylindrical downwardly extending body portion 26 integral with body portion 25. The lower end of reactor 23 and its connection to further processing equipment is not shown for convenience of illustration, since such equipment forms no part of our invention.

A gas inlet 27 extends through the wall of body portion 26, as, for example, below tapered body portion 25 and above restricted opening 14. Inlet 27 is preferably tangential to body portion 26 in the same manner as mixture inlet 19. In other words, inlet 27 preferably opens tangentially, as at tangential opening 28, into the interior of reactor 23. In this manner, a suitable reaction gas may be injected through inlet 27 into reactor 23 where it reacts with solids emitting from opening 14.

In operation, a two-phase gas-solids mixture, such as a mixture of coke particles and steam, is introduced into cyclone-injector 10 through mixture inlet 19.

Tangential opening 22, the velocity of injection of the mixture, and the inner walls of cyclone-injector 10 impart a tangential vortexing motion to the mixture so as to permit the mixture to flow downwardly in a spiral flow within cyclone-injector 10 (as indicated by the spiral line 29). During this downward spiral flow, the gas phase of the mixture is separated from the solids phase and this separated gas phase is removed from cyclone-injector 10 through gas outlettube 16 as indicated by the arrows 30. The solids phase of the mixture is then removed through restricted opening 14 in the form of a hollow, swirling cone 31 of solids. This cone 31, as can be seen in FIG. 1, immediately passes directly into the reaction zone of reactor 23 using solely the angular and axial momentum of the concentrated solids stream from cyclone-injector 10. Simultaneously, a suitable reaction gas is introduced through gas inlet 27 into the reactor 23. In this manner, a fast reaction between the solids injected and the gas injected into reactor 23 takes place.

The spray cone 31 is an excellent configuration for introducing particulate matter into a zone where a fast chemical reaction occurs with a reaction gas. The shape of the spray cone 31 of the solids may be regulated without decreasing the efficiency of cyclone-injector 10 by varying (1) the size of restricted opening 14, (2) the pressure drop imposed on the overhead gas (i.e., the gas removed from the mixture through tube 16), and (3) the inlet velocity of the solids-gas mixture (i.e., the velocity of the mixture through inlet 19). Further, the terms "reactor" and "reaction" are used herein to refer to any suitable treatment of the cone 31 of solids, as for example, to undergo heat transfer, mass transfer, and/or reaction.

Referring now to FIG. 3, wherein like numerals refer to like parts of FIGS. 1 and 2, a modified cyclone-injector 32 is shown for achieving higher solids injection velocity into reactor 23 and a wider angle spray of solids. Thus, as shown, an insert 33 is disposed longitudinally of cyclone-separator 32, preferably along the central longitudinal axis thereof. Insert 33 preferably includes an elongated rod member 34 secured, at its upper end, to the leg portion 18 of gas outlet tube 16 by any suitable means, as for example, a nut 35 and bolt 36 arrangement as shown. Rod member 34 then extends downwardly through leg portion 17 of gas outlet tube 16, through the interior of cyclone-injector 32, then flares outwardly at its lower portion 37 to form a generally horn-shaped body member 38. Instead of a third generally cylindrical body member 15 forming restricted opening 14, as shown in FIG. 1, the second lower body portion 12 of cyclone-injector 32 preferably includes an outwardly flared integral portion 39 which may be either secured to the bottom of body portion 12, as by welding 40, or otherwise be formed integral therewith.

The flaring of portion 39 is such that, together with the flaring of body member 38, a solids exit is formed as a restricted annular opening 41 at the lower end of the cyclone-injector 32. Preferably, the lower portion 42 of body member 38 extends downwardly slightly below the lowermost portion 43 of body portion 39, as shown. In this manner, the cone 44 of solids being emitted from cyclone-injector 32 is at a much wider angle of spray, and achieves a higher injection velocity within reactor 23. Insert 33 may be either hollow or solid, as desired.

In certain processes, it may be necessary to use more than one cyclone for the required separation. Thus, referring now to FIG. 4 wherein like numerals refer to like parts of FIG. 3, in addition to a first cyclone-injector 32 (identical to cyclone-injector 32 of FIG. 3), a second upper cyclone-injector 45 is disposed above the first lower cyclone-injector 32. Cyclone-injector 45 includes a first upper body portion 46 and a second lower body portion 47 similar to portions 11 and 12 of FIGS. 1 and 3. A gas exit tube 48 extends through and out of the top wall 49 of cyclone-injector 45. Exit tube 48 is similar to tube 16 of FIGS. 1 and 3, the particular orientation of the top portion being a matter of choice. The gas inlet 50 and tangential opening 51 into the interior of cyclone-injector 45 is also similar to inlet 19 and opening 22 of FIGS. 1 and 3. However, a substantially vertical branch portion 52 communicates gas inlet 50 of cyclone-injector 45 with the horizontal leg portion 18 of the gas outlet tube 16 of lower cyclone-injector 32.

The lower portion of the insert 53, terminating at the restrictive opening 41 of lower cyclone-injector 32, is identical in configuration with respect to the insert 33 of FIG. 3. However, in this embodiment of our invention, the restrictive opening 54 formed at the bottom of the lower body portion 47 of upper cyclone-injector 45 is in the form of a hollow solids exit tube 55 extending from opening 54, down through leg portion 17 of the gas outlet tube 16 of lower cyclone-injector 32 and into the interior thereof to form body member 38 (i.e., the constrictive insert at the solids exit of lower cyclone-injector 32.)

In operation, a gas-solids mixture is introduced into cyclone-injector 32 through inlet 19 to move tangentially in a spiral downwardly through cyclone-injector 32 as indicated by the arrow 29. A mixture of gas and solid fines passes upwardly through tube 16 (now a gas and fines outlet tube); into branch portion 52 and into cyclone-injector 45 through inlet 50 as indicated by arrows 56. Within cyclone-injector 45, the gas and solid fines mixture flows downwardly in spiral flow as indicated by arrow 57. The gas phase of this gas-fines mixture is separated therefrom and removed through gas outlet tube 48 as indicated by arrows 58. Finally, as indicated by arrows 59, the concentrated gas-fines mixture (now solid fines) moves downwardly through restrictive opening 54, into exit tube 55 and thus out body member 38 as a spray of fines 60. Meanwhile, the solids that were concentrated by the separation of gases and fines within cyclone-injector 32 exit out of annular opening 41 in a cone of solids 61, similar to the cone of solids 44 of FIG. 3. Both the cone of solids 61 and spray of fines 60 pass into the reaction zone of reactor 23 where a gas from gas inlet 27 is reacted therewith as discussed hereinabove with respect to FIGS. 1 through 3.

In this manner, a fast chemical reaction may be carried out in apparatus wherein at least two stages of separation must be accomplished. The pressures at the solids exits (i.e., openings 54 and 41, respectively) of cyclone-injectors 45 and 32 may be equalized by adjusting the cross-sectional area of the solids exit 41 of cyclone-injector 32.

In all embodiments of our invention, the resulting hollow, swirling cone of solid particles provides good mixing and uniform distribution within the reaction zone. Erosion of the opening 14 of the cyclone-injector 10 of FIG. 1 by the cone of solids 31 is negligible; erosion at the solids exits of the cyclone-injectors of FIGS. 3 and 4 will be minimal since, as the solids approach the exit, the solids are concentrated near the wall of the cyclone-injector (i.e., flared portion 39) and a layer of relatively particle-free gas protects insert 38 from erosion.

The apparatus and method disclosed hereinabove provide an improved technique for concentrating the solids in the feed to a reactor within a cyclone-injector whereby the solids outlet of the cyclone-injector is actually positioned within the reactor space. The large angular and axial momentum possessed by the solids at the cyclone-injector discharge (or solids exit) may then be utilized to disperse the solids across the reactor cross-section rather than having such momentum being dissipated in intervening piping.

We claim:

1. A method of concentrating a two-phase gas-solids mixture within a pair of vertically disposed upper and lower cyclone separators and utilizing the energy of the concentrated solids and solid fines streams of said cyclone separators to inject and disperse the solid particles into a reactor, the upper cyclone separator having a side wall and top wall with a gas outlet adjacent the top of said upper separator in communication with the interior thereof and a restricted solid fines outlet at its lower end, the lower cyclone separator having a side wall and a top wall with a gas-solid fines outlet adjacent the top of said lower separator and in communication with the interior thereof, and a restricted solids outlet formed at its lower end, the gas-solid fines outlet of said lower cyclone separator being in fluid communication with a gas-solid fines mixture inlet communicating with the interior of the upper separator below the top wall and above the solid fines outlet therefrom, the solid fines outlet of said upper separator being in fluid communication with the restricted solids outlet of the lower separator, said gas-solid fines outlet of said lower separator having a portion thereof substantially concentric with and surrounding said solid fines outlet of said upper separator, the lower end of said solid fines outlet having an outwardly flared portion forming a restricted annular space between the inner wall of the restricted solids outlet of the lower separator and the outer wall of said flared portion, said method comprising the steps of:

introducing said mixture into said lower separator below said top wall but above its restricted solids outlet;

imparting a tangential vortexing motion to said mixture so as to permit said mixture to flow downwardly in a spiral flow within said lower separator toward its restricted solids outlet;

separating the gas phase and solid fines of said mixture from said mixture while flowing said mixture downwardly within said lower separator; outlet tube passing said gas phase-solid fines mixture through the gas-solid fines outlet of said lower separator and into the gas-solid fines inlet of said upper separator;

imparting a tangential vortexing motion to said gas phase-solid fines mixture so as to permit said gas phase-solid fines mixture to flow downwardly in a spiral flow within said upper separator toward its restricted solid fines outlet;

separating the gas phase of said gas-phase-solid fines mixture while flowing said mixture downwardly within said upper separator;

removing said gas phase from said upper separator through said gas outlet;

removing the solid fines of said gas phase-solid fines mixture from said upper separator through said solid fines outlet and out said flared portion in the form of a spray of solid fines;

removing the solids phase of said gas-solids mixture from said lower separator through said restricted annular space in the form of a hollow, swirling cone of solids;

passing both said spray of solid fines and said cone of solids directly into the reaction zone of a reactor; and injecting a gas adapted to react with said fines and said solids into communication with the fines and solids in the reaction zone of said reactor.

2. Apparatus for concentrating a two-phase gas-solids mixture comprising:

a first upper cyclone separator having a side wall, a top wall and a gas outlet adjacent the top thereof in communication with the interior thereof;

a restricted solid fines outlet disposed at the lower end of said upper cyclone separator;

a second lower cyclone separator disposed substantially vertically below said first upper cyclone separator, said second separator having a side wall, a top wall, and a gas-solid fines outlet adjacent the top thereof and in communication with the interior thereof;

said lower separator having a restricted solids outlet at its lower end;

a gas-solids mixture inlet tangentially opening into the interior of said lower separator below the bottom wall thereof but above said restricted solids outlet;

said upper separator having a gas-solid fines mixture inlet communicating tangentially with the interior thereof, said inlet being below the top wall but above the solid fines outlet thereof;

the gas-solid fines outlet of said lower separator being in fluid communication with said gas-solid fines mixture inlet of said upper separator;

the solid fines outlet of said upper separator being in fluid communication with the restricted solids outlet of said lower separator;

said gas-solid fines outlet of said lower separator having at least a portion thereof substantially concentric with and surrounding the solid fines outlet of said upper separator;

the lower end of said solid fines outlet having an outwardly flared portion in fluid communication with said solid fines outlet forming a restricted annular space between the inner wall of the restricted solids outlet of the lower separator and the outer wall of said flared portion;

a reactor disposed below said restricted annular space and said flared portion in direct communication with both solids exiting from said lower separator through said annular space and fines exiting from said solid fines outlet through said flared portion; and a gas inlet associated with said reactor in fluid communication with said solids and fines entering said reactor.

* * * * *